UNITED STATES PATENT OFFICE 2,338,470

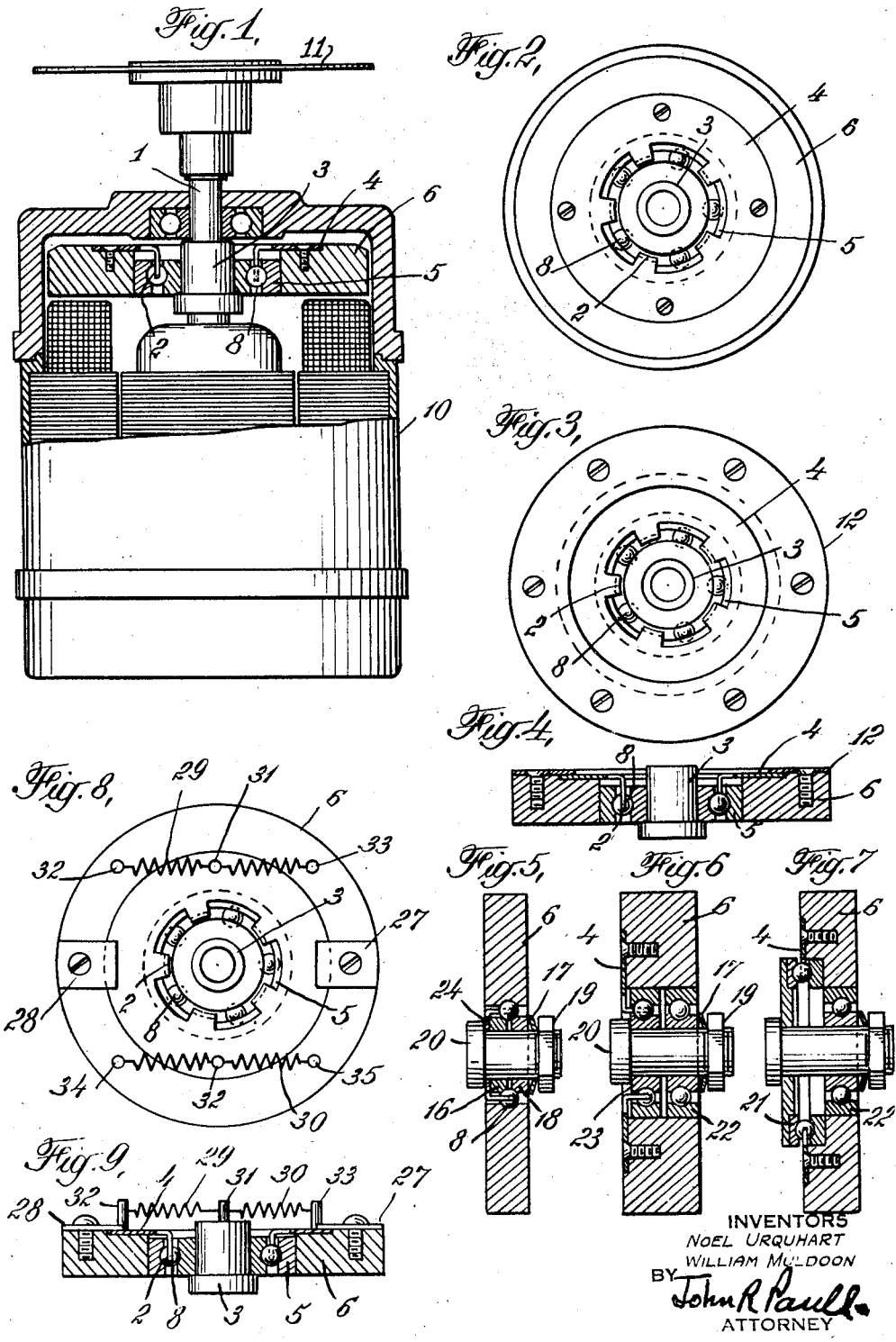
Jan. 4, 1944.    N. URQUHART ET AL    2,338,470
DAMPING MECHANISM
Filed Oct. 24, 1941
INVENTORS
NOEL URQUHART
WILLIAM MULDOON
BY John R Paull
ATTORNEY

DAMPING MECHANISM

Noel Urquhart, Stewart Manor, and William J. Muldoon, Farmingdale, N. Y., assignors to Control Instrument Company, Inc., Brooklyn, N. Y., a corporation of New York Application October 24, 1941, Serial No. 416,426

9 Claims. (Cl. 74—574)

This invention relates to means for damping oscillations in an indicating or receiving element responsive to quantities or signals which may change suddenly in magnitude and direction. The inertia of the indicating element reacting with the restoring force which operates the element, will cause oscillations which prevent a stable indication of the signal received until the normal friction drag on the element has damped out the oscillation. As friction drag interferes with the accuracy of the indication, it is desirable to keep it to a minimum and to employ a damping device which does not normally restrain the movable element. Electrical signalling systems of the self-synchronous type, to which this invention is particularly adaptable, often reach a condition where any large oscillation of the motor is self-sustaining. Sudden impulses transmitted through such a system, as when it is energized while not in synchronism, will usually produce this effect. This must be damped out or the oscillation may reach an amplitude sufficient to cause the motor to run in synchronism with the frequency of the supply voltage, instead of giving an indication of the signal transmitted to it.

While a number of such damping devices have been used, they are expensive and complicated in structure. In addition, that part of the damping device which is rigidly connected to the indicating element usually possesses an appreciable moment of inertia. In the present invention this is reduced to an absolute minimum.

It is the purpose of this invention to provide a damping means that is inexpensive and very simple in construction.

Another object is to reduce to a minimum any rotational loading of the indicating element by the damping device.

A further object is to provide a perfectly balanced and symmetrical structure and, therefore, one which produces no errors due to positioning of the receiver element, or to lateral acceleration of the element.

Referring to the drawing, Fig. 1 illustrates the simplest form of the invention, mounted in a self-synchronous receiver or motor. Fig. 2 is a plan view of the damping element. Figs. 3 and 4 show an arrangement providing for adjustment of the damping action. Figs. 5, 6 and 7 illustrate another method of controlling the damping action. Figs. 8 and 9 illustrate a modification for securing a smoother damping action.

In Fig. 1 the precision radial ball bearing 5 is mounted on a bushing 3, located on the shaft 1 of the self synchronous receiver motor 10. Dial 11 is mounted on the shaft 1 of the motor so that when the rotor of the latter rotates to assume a position in accordance with the electrical signal transmitted to the motor, such signal is then indicated on said dial. The outer race of the bearing 5 is secured to the inertia disk 6. The ball bearing 5 does not have the usual retainer for keeping the balls equally spaced. The balls are fitted tightly between the inner and outer races of the bearing and are spaced by the washer 4, which is fastened to one side of the disk 6. Its inner edge is bent inward and serrated so that the resulting teeth 2 project between adjacent balls in the ball bearing. The teeth serve to space the balls, but are sufficiently narrow to allow considerable movement of the balls between the teeth.

When a sudden impulse is transmitted to the shaft 1, the inertia of the disk 6 prevents it from following the impulse as the only coupling between the shaft 1 and the disk 6 is at first the small amount of friction in the ball bearing 5. But as the inner race rotates with respect to the outer race through a movement which is unrestrained except for a negligible amount of friction between said races and the balls 8, the latter will move with respect to the outer race, until their motion is retarded by the teeth 2 in the washer 4. The ball bearing action then becomes a friction bearing action, as the balls no longer rotate freely. The shaft 1 then accelerates the disk 6 due to the greatly increased friction drag between them. When the impulse ceases, the disk 6 has acquired sufficient speed so that it continues to rotate and the balls which were in contact with one side of the teeth 2 in the washer 4 will move against the other side of the teeth. At the same time the inertia of the receiver motor causes it to overshoot the true indication, and then reverse its direction. The disk 6 being in motion then applies a restraining force to this reverse motion, through its friction coupling with the shaft. Thus a damping effect is produced which may go through several cycles before the amplitude of the oscillation is brought to a value less than the free movement of the balls 8 between the teeth 2. The final damping effect bringing the rotor to rest is produced by the normal friction of the rotor in its bearings.

The amount of friction drag produced when the motion of the balls 8 is arrested by the teeth 2 in the washer 4 is dependent upon how tightly the balls 8 fit between the inner and outer ball races. A proper selection of the sizes of the balls and races is necessary to secure a fit giving the correct friction drag.

The modified form of the invention, shown in Figs. 3 and 4, illustrates another means of controlling the friction drag, Fig. 3 being a plan view and Fig. 4 a section. In Fig. 4 the serrated washer 4 is not rigidly fastened to the disk 6, but is clamped to it by the thin and flexible friction ring 12. The balls 8 in this case are not arrested in their motion when they strike the teeth of the serrated washer 4, but rotate the washer against friction. Adjustment of the pressure exerted by the friction ring 12 on the washer 4 will cause the washer to slip at any desired value of torque, this being secured by placing paper shims between the ring 12 and the disk 6. The sizes of balls and races in this case are selected to secure a freely running fit that is also tight enough to drive the washer 4 against friction.

In Fig. 5 the outer race of the ball bearing is shown as being formed in the disk 6 itself. The inner race is shown in two sections; the section 16 being mounted fast to the threaded bushing 20, while the section 18 can slide on the bushing 20. The washer 24 is fastened between the shoulder on bushing 20 and the section 16. It has projections on its outer edge that are bent to fit between the balls 8.

The movable section 18 is urged toward the the section 16 by the spring washer 17 and the locknut 19. Adjustment of the pressure between the inner and outer races is accomplished by means of the locknut 19; thus giving control of the friction drag between the bushing 20 and the disk 6, which occurs when the balls are arrested by the teeth in the washer 24. This arrangement has the advantage that exact sizes need not be maintained in the selection of balls and races, since an adjustment is provided. The ball races need not be of hardened steel, since any wear that may occur under the light conditions of service is taken care of by the spring washer 17, without adjustment of locknut 19.

This design lends itself to very inexpensive manufacture since the locknut 19 can be replaced by a plain washer, held in place by riveting the end of bushing 20. The form of restraining washer 24 employed in this design can also be used in other forms of the invention to give a somewhat simpler structure.

A similar adjustable arrangement is shown in Fig. 6, which employs two ball bearings, 22 and 23, mounted on opposite sides of the inertia disk 6. The inner race of bearing 23 is fast to the bushing 20, while the inner race of bearing 22 is free to slide on the bushing 20 and is urged toward bearing 23 by the spring washer 17 and the locknut 19.

Another arrangement is shown in Fig. 7, employing a thrust bearing 21 in place of the radial bearing 23 of Fig. 6.

A smoother damping action can be obtained by means of the arrangement shown in Figs. 8 and 9; Fig. 8 being a plan view and Fig. 9 a view in section. The serrated washer 4 is not rigidly attached to disk 6, but is retained in a recess in the disk 6 by the clamps 27 and 28. The pins 31 and 32, mounted on the washer 4, are fastened to the mid points of springs 29 and 30, the ends of which are secured to pins 32, 33, 34 and 35, mounted on the disk 6. Thus the washer 4 can rotate with respect to the disk 6, but is restrained by springs 29 and 30. When the balls 8 engage the teeth on the washer 4, the washer 4 rotates against spring pressure until sufficient force is exerted to stop the motion of the balls and cause sliding friction. This modification can be applied to all forms of the invention, except that shown in Figs. 3 and 4.

It will be noted that in all forms of the invention, the only parts secured to the rotor shaft are the inner races of the ball bearings used and the bushing assembly on which it is mounted. This reduces to an absolute minimum the moment of inertia added to the indicating element.

It is evident that considerable modification can be made in the arrangements shown and the scope of the invention is therefore not to be limited except as indicated by the following claims.

We claim:

1. Damping means for the shaft of an indicating element having oscillatory movements, comprising, in combination, an inertia member axially supported relative to said shaft, a bearing interposed between said inertia member and said shaft and including spaced raceways and bearing elements having a tight fit with said raceways in the space therebetween, one of said raceways being secured to said inertia member, and said raceways having limited unrestrained relative rotary movements between the same and cooperating with said bearing elements at the limits of said unrestrained rotation to generate a friction drag which will, together with said inertia member, damp out the oscillations of said shaft and means cooperating with said bearing elements to limit the unrestrained movements of said raceways.

2. Damping means for the shaft of an element having oscillatory movements comprising, in combination, an inertia member mounted about said shaft, a bearing assembly interposed between said shaft and inertia member and including spaced raceways and bearing elements having a tight fit with said raceways, one of the latter being secured to said inertia member, and the raceways having unrestrained relative movements of limited magnitude therebetween, and a limiting member having projections extending between said bearing elements and into the space formed by said raceways, said projections defining the limits of said magnitude of movements and combining with the tight fit formed between said raceways and bearing elements to produce a friction drag sufficient to damp out the oscillations of said shaft.

3. Damping means for the shaft of an indicating element having oscillatory movements comprising, in combination, an inertia member mounted about said shaft, a bearing assembly interposed between said shaft and inertia member and including spaced raceways and bearing elements having a tight fit with said raceways, one of the latter being secured to said inertia member, and the raceways having unrestrained relative movements of limited magnitude therebetween, and a limiting member carried by said inertia member and having projections extending between said bearing elements to define the limits of said magnitude of movements, said projections constituting the only means to restrain said relative movements and combining with the tight fit formed betwen said raceways and bearing elements to produce a friction drag sufficient to damp out the oscillations of said shaft.

4. Damping means for the shaft of an indicating element having oscillatory movements comprising, in combination, an inertia member mounted about said shaft, a bearing assembly interposed between said shaft and inertia member and including spaced raceways and ball bearings in the space therebetween, said raceways and bearings being tightly fitted for relative unrestrained movements and ball bearing action therebetween within limited magnitudes, and limiting projections arranged in said space and between said ball bearings and contacted thereby during oscillations of said shaft to convert said ball bearing action into a friction bearing action sufficient, due to said tight fit, to dampen the oscillations of said shaft.

5. In a mechanism for dampening out oscillations in an indicating or receiving element having a shaft, an inertia member, a bearing assembly mounted about said shaft and associated with said inertia member, said assembly including raceways and bearing elements, projections interposed between said bearing elements, and sliding means coupling said projections to one of the raceways of said assembly.

6. In a mechanism for damping out oscillations in an indicating or receiving element having a shaft, an inertia member, a bearing assembly mounted about said shaft and associated with said inertia member, said assembly including raceways and bearing elements, projections interposed between said bearing elements, and resilient means coupling said projections to one of said raceways.

7. In a mechanism for damping out oscillations in an indicating or receiving element having a shaft, an inertia member, a bearing assembly mounted about said shaft in association with said inertia member and including separable raceways and bearing elements, one of said raceways being adjustable relative to the other in an axial direction, means for adjusting the first named raceway, projections between said bearing elements, and means coupling said projections to the second named raceway.

8. In a mechanism for damping out oscillations in an indicator or receiving element having a shaft, an inertia member, a bearing assembly mounted about said shaft in association with said inertia member and including separable raceways and bearing elements, one of said raceways being adjustable relative to the other in an axial direction, resilient means causing axial forces between said separable raceways, and projections interposed between the bearing elements of said assembly.

9. In a mechanism for damping out oscillations in an indicating or receiving element having a shaft, a bearing assembly about said shaft and including axially separable raceways and bearing elements, an inertia member encircling said assembly, resilient means causing an axial force between said separable raceways, projections between the bearing elements of said assembly, and means to couple said projections to one of said raceways.

NOEL URQUHART.
WILLIAM J. MULDOON.